United States Patent
Kopetzky et al.

[11] Patent Number: 6,076,239
[45] Date of Patent: Jun. 20, 2000

[54] SEAT BELT BUCKLE WITH SLIDE SENSOR

[75] Inventors: Robert Kopetzky, Lonsee; Frank Pietschmann, Sontheim; Thomas Steidle, Ulm; Matthias Pleyer, Senden, all of Germany

[73] Assignee: Takata (Europe) Vehicle Safety Technology GmbH, Ulm, Germany

[21] Appl. No.: 09/058,152

[22] Filed: Apr. 10, 1998

[30] Foreign Application Priority Data

Apr. 11, 1997 [DE] Germany .......................... 197 15 133

[51] Int. Cl.⁷ .............................. A44B 11/00; B60R 22/00
[52] U.S. Cl. ................... 24/633; 24/641; 24/656; 24/602
[58] Field of Search ............... 24/633, 641, 656, 24/602

[56] References Cited

U.S. PATENT DOCUMENTS

| | | | |
|---|---|---|---|
| 3,766,612 | 10/1973 | Hattori | 24/230 |
| 3,882,337 | 5/1975 | Pfeffer et al. | 310/273 |
| 4,027,362 | 6/1977 | Hart et al. | 24/656 |
| 4,575,907 | 3/1986 | Takada | 24/641 |
| 4,785,906 | 11/1988 | Kang | 180/270 |
| 4,920,620 | 5/1990 | Yamamoto | 24/641 |
| 5,218,744 | 6/1993 | Saito | 24/303 |
| 5,220,713 | 6/1993 | Lane, Jr. et al. | 24/633 |
| 5,742,986 | 4/1998 | Corrion et al. | 24/633 |
| 5,752,299 | 5/1998 | Vivacqua et al. | 24/633 |
| 5,758,393 | 6/1998 | Wier | 24/633 |

FOREIGN PATENT DOCUMENTS

| | | |
|---|---|---|
| 0 341 839 | 11/1989 | European Pat. Off. . |
| 25 15 017 | 10/1976 | Germany . |
| 28 07 575 | 8/1979 | Germany . |
| 36 21 710 | 11/1987 | Germany . |
| 30 26 426 | 4/1988 | Germany . |
| 37 13 879 | 9/1988 | Germany . |
| 37 13 880 | 9/1988 | Germany . |
| 40 33 181 | 3/1992 | Germany . |
| 43 38 485 | 5/1995 | Germany . |
| 44 41 184 | 6/1995 | Germany . |
| 295 10 700 | 8/1995 | Germany . |

*Primary Examiner*—Victor N. Sakran
*Attorney, Agent, or Firm*—Foley & Lardner

[57] ABSTRACT

A belt lock for a safety belt has a frame (10), a latching element (14) for the latching of the belt tongue (18) and a securing element (16), which secures the latching element (14) in the latched state. Furthermore, a detector device (24, 26, 28) is provided at the belt lock which detects the position of the securing element (16).

11 Claims, 1 Drawing Sheet

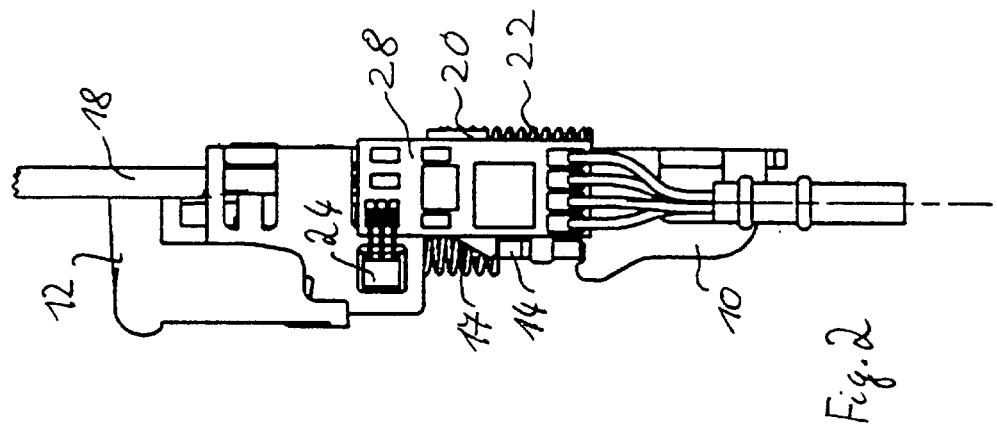
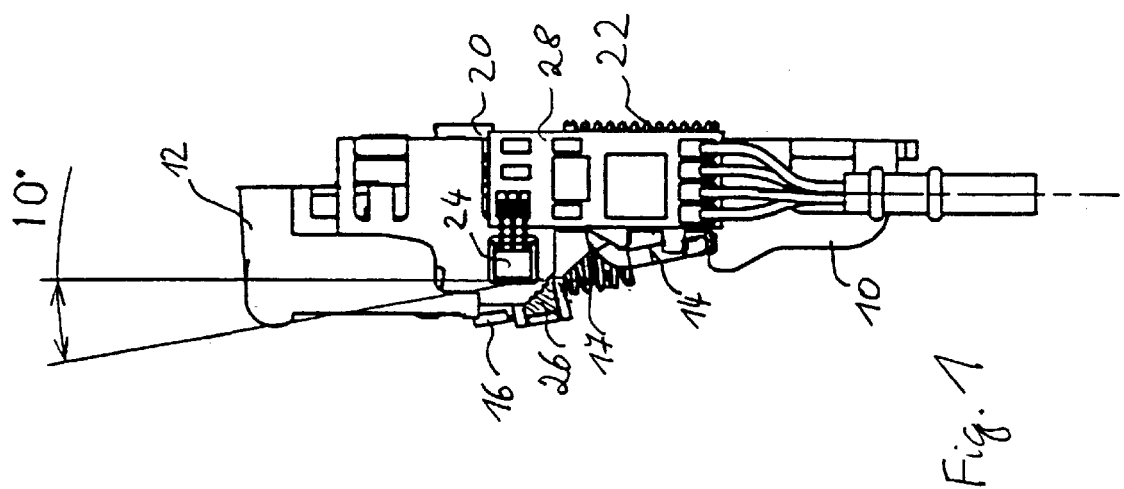

SEAT BELT BUCKLE WITH SLIDE SENSOR

BACKGROUND OF THE INVENTION

1. Field of the Invention

The present invention relates to a belt lock for a safety belt. Such belt locks are fundamentally known and serve to reliably and releasably latch the belt tongue of the safety belt after the belt has been put on.

2. Description of Related Art

An electrical signal which gives an indication of whether a safety belt has been put on can be necessary for some applications, in particular in motor vehicles. A signal of this kind can be used to actuate warning devices which signal to the vehicle occupants that the safety belt still has to be put on. Moreover, a signal of this kind can be connected to an airbag control, whereby the airbag can be triggered earlier if the person located on the associated seat is not belted in, in order to offer the greatest possible protection. In just the same way a triggering of the belt tensioner can be prevented when the relevant belt is not in use.

Belt locks in which an electromechanical switching element is incorporated, which detects the latching of a latch element which latches the belt tongue, are fundamentally known. Such devices have, however, the disadvantage that the switching element always exerts a force on the latching element which is opposed to the latching direction. This is undesirable because in this way a permanently reliable operation is not ensured. Moreover, the danger exists that the switching device will already transmit a signal when the belt tongue is admittedly engaged in the belt lock but not reliably latched (pseudo-latching).

SUMMARY OF THE INVENTION

It is accordingly the an object of the present invention to provide a belt lock which detects the reliable latching of the belt tongue in a fault-free manner.

The solution of this problem is achieved, by providing a detector device at the belt lock which detects the position of the securing element. In the belt lock of the invention it is thus not only the position of the latching element which is detected but also the position of the securing element. A signal can be generated in particular when the closed end position of the securing element is detected, which is only triggered when both the latching element and the securing element are located in the latched end position. Thus, in accordance with the invention, a situation is precluded in which a signal is also generated when the belt lock is only pseudo-latched, i.e. when the possibility still exists that the belt tongue releases from the belt lock.

Accordingly, it is advantageous when the securing element first executes a pivotal movement and subsequently a stroke movement during latching. In this way the detector device can be so arranged in the belt lock that the end of the stroke movement of the securing element is detected. Since the belt lock is in any event latched in an orderly manner when the securing element has finished its stroke movement, the signal which is hereby generated can give reliable information concerning the latching of the belt tongue in the belt lock.

It is particularly advantageous when the detector device is a contact-free sensor, since in this case the latching of the latching element or the movement of the securing element are not hindered in any way. In particular an actuating force which could prevent orderly latching or locking, or make it more difficult, does not oppose any element of the belt lock.

In accordance with a further advantageous embodiment of the invention the detector device is arranged at least in part in a cut-out of the frame of the belt lock. In this way the detector device can, on the one hand, be arranged in a space-saving manner and can, on the other hand, be arranged very close to the securing element. In particular, in the case of a Hall probe, a cut-out of circa 5×5 mm is sufficient in order to install a corresponding component. Unintentional shifting of the detector element can be prevented by a firm fixation of the detector element in the cut-out.

In accordance with a further advantageous embodiment the detector device can be arranged at least in part on or in the securing element. In the case of the already mentioned Hall probe a magnet with very small dimensions can be secured to the securing element. It is also possible to integrate the magnet into the securing element. If the securing element consists of plastic, the magnet can, for example, be embedded during the injection moulding process. It is, however, also possible to manufacture the securing element partly from a magnetisable plastic and to make the region lying opposite to the Hall probe permanently magnetised.

Even if the use of a Hall probe is preferred in accordance with the invention, other contact-less sensors are fundamentally also possible. For example a reflection light barrier could be arranged on the frame which is directed to a strongly reflecting or absorbing region of the securing element. A further variant consists of a capacitive proximity switch, the capacitor of which forms the time determining element of an oscillator. In this arrangement the capacitor can be formed by a fixed plate (belt lock frame) and a movable plate.

The Hall probe can be designed as a digital switch or as a linear sensor, which transmits an analogue profile. In the latter case a comparison must be made with a predetermined reference mark for the determination of the switching point.

It is particularly advantageous when a miniature circuit board, on which a microchip is located, is provided at the belt lock close to the detector device. In this case an amplified electrical signal is transmitted at the output of the circuit board, which can be transmitted on further with little interference.

BRIEF DESCRIPTION OF THE DRAWINGS

The present invention will be described purely by way of example in the following with reference to an advantageous embodiment and to the accompanying drawings.

There are shown:

FIG. 1 a side view of a belt lock in accordance with the invention, without an inserted belt tongue, and FIG. 2 the belt lock of FIG. 1 with an inserted, latched and secured belt tongue.

DETAILED DESCRIPTION OF THE PREFERRED EMBODIMENTS

The belt lock shown in FIGS. 1 and 2, of which the plastic housing has been admitted in the illustration, has a substantially U-shaped frame (10) on which a delatching button 12, a latching element 14 and also a securing element 16 are secured.

For the latching of the belt tongue 18 (FIG. 2) of a safety belt, the belt tongue 18 is introduced into the belt lock, with the two limbs and also the rear side of the frame 10 and a surface of the delatching button 12 forming a guide. On insertion of the belt tongue 18 into the belt lock, the front end face of the tongue first strikes an ejector 20, which is longitudinally displaceably guided in the frame 10. On further insertion of the belt tongue, the ejector 20 is pressed downwardly against the force of the ejection spring 22.

The latching element 14 which is pivotally journalled in the frame 10 has, at its lower end, a tongue (which cannot be seen in the drawings), against which the ejector 20 abuts when the belt tongue has been fully inserted into the belt lock. In this way the latching element 14 is pivoted to the right away from the inclined position shown in FIG. 1 until it extends substantially parallel to the inserted belt tongue 18. The belt tongue 18 is latched in the belt lock by a latching nose (which cannot be seen in the Figures) formed onto the latching element 14 and which engages into a cut-out of the belt tongue. As indicated in FIG. 1 the latching element 14 accordingly pivots through circa 10° when it is pivoted into the latched position by the insertion of the belt tongue 18.

The securing element 16, which secures the latching element 14 in the latched state, is provided in order to prevent the latching element 14 from being undesirably released from the latched position. The securing element 16 is formed for this purpose as a slide which is secured to the latching element 14 and which, on the one hand, can be pivoted together with the latching element 14. On the other hand, the carriage or the securing element 16 can also be displaced on the latching element 14 in or opposite to the insertion direction of the belt tongue 18. In the non-latched state shown in FIG. 1, the securing element 16 is pressed by a spring 17 against a (not shown) holding pin. On inserting the belt tongue 18 into the belt lock, the latching element 14 is pivoted as described above, with the securing element 16 being pivoted with it. However, after the latching element 14 has reached its latching position (parallel to the inserted belt tongue 18), the securing element 16 has been pivoted with it to such an extent that it can be pressed by the spring 17 in the direction of the delatching button 12 and beneath the holding pin. In this way the securing element 16 is displaced linearly by the spring 17 in the direction of the delatching button 12 to such an extent that the latching element 14 is pushed between the holding pin and the latching element 14 which is already located in its end position. In this position the securing element 16 is held by the spring so that it is no longer possible for the latching element 14 to release automatically from the latched state.

In order to open the belt lock, the unlocking button 12 must be actuated against the force of a non-illustrated spring, whereby the securing element 16 is pressed downwardly against the force of the spring 17, and frees the space between the latching element 14 and the holding pin. Following this, the latching element 14 tilts back into the unlatched position (FIG. 1), whereby the belt tongue 18 is ejected out of the belt lock by the ejector 20 as a result of the spring force of the ejection spring 22.

A detector device is provided at the belt lock shown in FIG. 2 and has, in the illustrated embodiment, a Hall probe 24 and a magnet 26. The Hall probe 24 is arranged in a cut-out or a window of the frame 10. The magnet 26, which is shown in hatched lines in FIG. 1, is secured to the securing element 16. The positions of the Hall probe 24 and of the magnet 26 are selected in accordance with the invention such that the Hall probe 24 and the magnet 26 only lie close to and opposite one another when the securing element 16 is located in its closed end position. The detector device thus detects the position of the securing element and, in the selected embodiment, only the closed end position of the securing element 16. The Hall probe thus only transmits a signal when the securing element 16 has completely executed both its pivotal movement through about 10° and also its subsequent stroke movement in the direction of the unlocking button 12.

The Hall probe 24 is arranged on a miniature circuit board 28 which is secured to the frame 10 of the belt lock. Various electronic components are located on this circuit board, and in particular an integrated circuit which generates an electrical signal at the output of the circuit board which no longer has to be amplified but can rather be immediately led to a corresponding evaluation device. It is, however, also possible to provide the detector element itself as an integrated circuit which already satisfies the amplification and switching function. In this case the circuit board can serve to produce a belt lock switch which is capable of being diagnosed.

Through the arrangement of the detector device at the belt lock in accordance with the invention, a signal is generated at the output of the circuit board 28, which permits a reliable conclusion as to whether the belt lock is actually latched or is only apparently latched. With a pseudo-latching, the signal "not latched" appears at the output of the circuit board because the magnetic field detected by the detector element is substantially smaller as a result of the incomplete or missing stroke movement of the securing element than the magnetic field measured with orderly latching and securing. Accordingly, in the case of actual latching, i.e. the orderly latching of both the latching element 14 and also of the securing element 16, a signal arises with a linear sensor as a detector element, which is about 5 times as strong as the corresponding signal in case of the so-called pseudo-latching in which the securing element 16 has not latched in an orderly manner. As a result of the selected arrangement in which the Hall probe 24 is secured to a circuit board 26, which is likewise located at the frame 10, a galvanic separation from the evaluation electronics (e.g. the airbag control) can be achieved by an optocoupler or the like arranged on the circuit board, which enhances the security of the system. In order to further reduce the influence of disturbing magnetic fields, the circuit board can also be used with a microprocessor which compares the signals transmitted by the Hall probe with stored characteristics. Substantially more complex transmission protocols can be realised through the use of such a microcontroller within the belt lock. At the same time electronic screening measures can be realized hereby.

It is claimed:

1. A belt lock for a safety belt comprising:

a frame;

a latching element for latching a belt tongue;

a securing element which secures the latching element in a latched state;

a detector device which detects a position of the securing element; and a circuit board arranged in the area of the frame and including an evaluation circuit for the detector device.

2. A belt lock in accordance with claim 1, wherein the securing element first executes a pivotal movement during latching and subsequently a stroke movement, and wherein the detector device detects an end of the stroke movement.

3. A belt lock in accordance with claim 1, wherein the detector device is a contact-free sensor.

4. A belt lock in accordance with claim 1, wherein the detector device is arranged at least in part in a cut-out of the frame.

5. A belt lock in accordance with claim 1, wherein the detector device is arranged at least in part on the securing element.

6. A belt lock in accordance with claim 1, wherein the detector device has a Hall probe and a magnet, and wherein the magnet is integrated into the securing element.

7. A belt lock in accordance with claim 1, wherein the securing element includes a magnetic plastic.

8. A belt lock in accordance with claim 1, wherein a circuit board with a microcontroller for the detector device is arranged in the area of the frame.

9. A belt lock in accordance with claim 1, wherein the detector device detects a closed end position of the securing element.

10. A belt lock in accordance with claim 1, wherein the detector device is a Hall-probe.

11. A belt lock in accordance with claim 1, wherein the detector device is arranged in the securing element.

* * * * *